(12) United States Patent
Lim et al.

(10) Patent No.: US 8,570,640 B2
(45) Date of Patent: Oct. 29, 2013

(54) ELECTROPHORETIC DISPLAY DEVICE AND METHOD OF FABRICATION THEREOF

(75) Inventors: Yu-Sok Lim, Seoul (KR); Young-Jun Yu, Seoul (KR)

(73) Assignee: LG Display Co., Ltd., Seoul (KR)

( * ) Notice: Subject to any disclaimer, the term of this patent is extended or adjusted under 35 U.S.C. 154(b) by 59 days.

(21) Appl. No.: 13/221,047

(22) Filed: Aug. 30, 2011

(65) Prior Publication Data

US 2012/0050840 A1 Mar. 1, 2012

(30) Foreign Application Priority Data

Sep. 1, 2010 (KR) .......................... 10-2010-0085651

(51) Int. Cl.
*G02B 26/00* (2006.01)
(52) U.S. Cl.
USPC .......................................................... 359/296
(58) Field of Classification Search
USPC ................. 359/296; 345/107; 430/32, 38, 34; 204/600, 450; 445/24
See application file for complete search history.

(56) References Cited

U.S. PATENT DOCUMENTS

| | | | | |
|---|---|---|---|---|
| 7,079,303 B2* | 7/2006 | Hou et al. | ...................... | 359/296 |
| 7,286,279 B2* | 10/2007 | Yu et al. | ......................... | 359/296 |
| 7,355,784 B2* | 4/2008 | Kim | ............................... | 359/296 |
| 7,804,638 B2* | 9/2010 | Yamamoto | ..................... | 359/296 |
| 7,964,876 B2* | 6/2011 | Umezaki | ........................... | 257/72 |
| 2002/0008898 A1* | 1/2002 | Katase | ............................ | 359/296 |
| 2004/0032389 A1* | 2/2004 | Liang et al. | .................... | 345/107 |
| 2009/0109520 A1* | 4/2009 | Park et al. | ...................... | 359/296 |
| 2010/0265565 A1* | 10/2010 | Wang et al. | .................... | 359/296 |

* cited by examiner

*Primary Examiner* — Tuyen Tra
(74) *Attorney, Agent, or Firm* — Morgan, Lewis & Bockius LLP (57) ABSTRACT

Disclosed herein is a method of fabricating an electrophoretic display device for reducing the fabrication cost and simplifying the fabrication process, and the method may include providing a substrate comprising a display region arranged with a plurality of pixels and a non-display region; forming a thin-film transistor on a first substrate; forming a passivation layer on the substrate formed with the thin-film transistor; forming a pixel electrode in the display region on the passivation layer and forming a partition wall in the non-display region; filling an electrophoretic material in a pixel inside the partition wall on the passivation layer; applying a sealing material to an upper portion of the electrophoretic material to form a sealing layer; depositing a transparent conductive material on the sealing layer to form a common electrode; and adhering the protection layer to an upper portion of the common electrode.

36 Claims, 6 Drawing Sheets

ELECTROPHORETIC DISPLAY DEVICE AND METHOD OF FABRICATION THEREOF

CROSS-REFERENCE TO RELATED APPLICATIONS

Pursuant to 35 U.S.C. §119(a), this application claims the benefit of earlier filing date and right of priority to Korean Application No. 10-2010-0085651 filed on Sep. 1, 2010, the contents of which are incorporated by reference herein in its entirety.

BACKGROUND OF THE INVENTION

1. Field of the Invention

The present invention relates to an electrophoretic display device and method of fabrication thereof.

2. Description of the Related Art

An electrophoretic display device is an image display device using a phenomenon that colloidal particles move to either one of the polarities when one pair of electrodes to which a voltage is applied are immersed into a colloidal solution. Contrary to a liquid crystal display device, such an electrophoretic display device has the advantage of wide viewing angle, high reflectivity, low power consumption, and the like, without using a backlight and thus it is widely used as an electronic device such as an electronic paper.

The electrophoretic display device has a structure in which an electrophoretic layer is interposed between two substrates. One of the two substrates is made of a transparent substrate and the other substrate is configured with an array substrate formed with a driving element to display images in a reflective mode in which light entering from the outside of the device is reflected.

Figure 1:
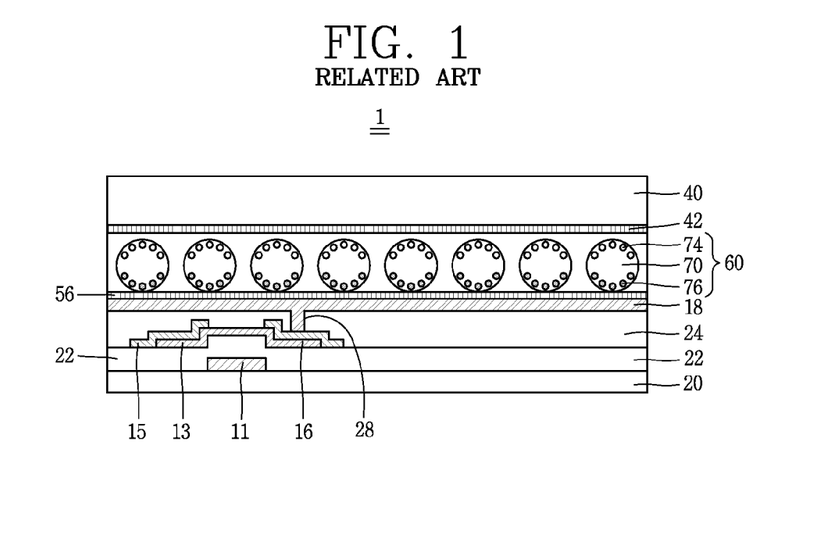
FIG. 1 is a view illustrating an electrophoretic display device in the related art.

FIG. 1 is a view illustrating the structure of an electrophoretic display device 1 in the related art. As illustrated in FIG. 1, the electrophoretic display device 1 may include a first substrate 20 and a second substrate 40, thin-film transistors and a pixel electrode 18 formed on the first substrate 20, a common electrode 42 formed on the second substrate 40, an electrophoretic layer 60 formed between the first substrate 20 and the second substrate 40, and an adhesive layer 56 formed between the electrophoretic layer 60 and the pixel electrode 18.

The thin-film transistor may include a gate electrode 11 formed on the first substrate 20, a gate insulation substrate 22 formed over the overall first substrate 20 formed with the gate electrode 11, a semiconductor layer 13 formed on the gate insulation substrate 22, and a source electrode 15 and a drain electrode 16 formed on the semiconductor layer 13. A passivation layer 24 is formed on the source electrode 15 and drain electrode 16 of the thin-film transistor.

The pixel electrode 18 for applying a signal to the electrophoretic layer 60 is formed on the passivation layer 24. Here, a contact hole 28 is formed on the passivation layer 24, and the pixel electrode 18 is connected to the drain electrode 16 of the thin-film transistor through the contact hole 28.

Furthermore, a common electrode 42 is formed on the second substrate 40 and an electrophoretic layer 60 is formed on the common electrode 42. Here, an adhesive layer 56 is formed on the electrophoretic layer 60 to attach the second substrate 40 including the electrophoretic layer 60 to the first substrate 20. The electrophoretic layer 60 may include a capsule 70 filled with white particles 74 and black particles 76 having an electrophoretic characteristic therein. When a signal is applied to the pixel electrode 18, an electric field is generated between the common electrode 42 and the pixel electrode 18, and white particles 74 and black particles 76 inside the capsule 70 are moved in a direction of the common electrode 42 or pixel electrode 18 by the electric field, thereby implementing an image.

For example, when a negative (−) voltage is applied to the pixel electrode 18 on the first substrate 20 and a positive (+) voltage is applied to the common electrode 42 on the second substrate 40, the positive (+) charged white particles 74 are moved to the side of the first substrate 20 and the negative (−) charged black particles 76 are moved to the side of the second substrate 40. In this state, when light is incident from the outside, i.e., an upper portion of the second substrate 40, incident light is reflected by the black particles 76, thereby implementing black on the electrophoretic display device.

On the contrary, when a positive (+) voltage is applied to the pixel electrode 18 on the first substrate 20 and a negative (−) voltage is applied to the common electrode 42 on the second substrate 40, the positive (+) charged white particles 74 are moved to the side of the second substrate 40 and the negative (−) charged black particles 76 are moved to the side of the first substrate 20. In this state, when light is incident from the outside, i.e., an upper portion of the second substrate 40, incident light is reflected by the white particles 74, thereby implementing white on the electrophoretic display device.

However, the electrophoretic display device 1 having the foregoing structure in the related art may have the following problems.

First, the method of fabricating an electrophoretic display device in the related art has difficulty in attaching the first substrate to the second substrate.

In the electrophoretic display device 1 in related art, the first substrate 20 and second substrate 40 are individually fabricated, and then the first substrate 20 is attached to the second substrate 40 by the adhesive layer 56 to complete the process. In other words, a thin-film transistor for driving a unit pixel and the pixel electrode 18 for applying an electric field to the electrophoretic layer are formed on the first substrate 20, and the common electrode 42, the electrophoretic layer 60 and the adhesive layer 56 are formed on the second substrate 40, and then the first substrate 20 is attached to the second substrate 40 to complete the process.

However, the unit pixel in a typical electrophoretic display device may be formed with a small size less than 150 micrometer in the height and width thereof, and thus it may be difficult to align the electrophoretic layer to accurately match to the size. If the electrophoretic layer is not accurately aligned with the first substrate formed with a thin-film transistor, then an electric field will not be accurately transferred to electrophoretic particles, thereby causing a driving error.

Second, the method of fabricating an electrophoretic display device in the related art has a complicated fabrication process. The first substrate 20 and the second substrate 40 must be fabricated in a different process, and then transferred by a transfer means and attached to each other in the attachment process, thereby causing a delay during the fabrication process and increasing the fabrication cost.

Third, electrostatic discharge generated during the process of attaching the first substrate to the second substrate may cause failure in the initial alignment of electrophoretic particles.

The common electrode 42 and the electrophoretic layer 60 are formed on the second substrate 40, and the adhesive layer 56 is applied to the electrophoretic layer 60. Furthermore, a protection layer is adhered to the adhesive layer 56 in order to prevent the adhesive force of the adhesive layer 56 from being reduced and prohibit foreign materials from being adhered to the adhesive layer 56. However, the protection layer should be peeled off from the second substrate 40 to adhere the second substrate 40 to the first substrate 20, but during the process of peeling off the protection layer, electrostatic discharge may be generated, and as a result, the generated electrostatic discharge may cause misalignment in the initial alignment of electrophoretic particles. The misalignment of electrophoretic particles due to the electrostatic discharge may cause comb-tooth-shaped moiré during the operation of the electrophoretic display device.

SUMMARY OF THE INVENTION

The present invention is contrived to solve the aforementioned problem, and an object of the present invention is to provide an electrophoretic display device and fabrication method thereof in which an electrophoretic layer, a sealing layer, and a common electrode are directly formed on a substrate formed with a thin-film transistor.

In order to accomplish the foregoing objectives, there is provided a method of fabricating an electrophoretic display device according to the present invention, and the method may comprises providing a substrate including a display region having a plurality of pixels and a non-display region at the out side of the display region; forming a thin-film transistor at each pixel on a first substrate; forming a passivation layer on the substrate to cover the thin-film transistor; forming a pixel electrode in the display region on the passivation layer and forming a partition wall in the non-display region; filling an electrophoretic material in a pixel inside the partition wall on the passivation layer; applying a sealing material to an upper portion of the electrophoretic material to form a sealing layer; depositing a transparent conductive material on the sealing layer to form a common electrode; and adhering the protection layer to an upper portion of the common electrode.

For the pixel electrode and partition wall, the pixel electrode may be formed in the display region on the passivation layer and then the partition wall may be formed in the non-display region on the passivation layer, and otherwise, the partition wall may be formed in the non-display region on the passivation layer and then the pixel electrode may be formed in the display region on the passivation layer.

The process of forming a sealing layer may include applying a sealing material to an upper portion of the electrophoretic layer or a top surface of the partition wall and an upper portion of the electrophoretic layer, and curing the sealing material. At this time, the sealing material may be formed of at least any one selected from a group consisting of an acrylic transparent organic resin, an overcoat transparent organic material, and a hybrid transparent organic material.

The common electrode may be formed of material selected from a group consisting of indium gallium zinc oxide (IGZO), zinc oxide (ZnO), indium tin oxide (ITO), indium zinc oxide (IZO), tin oxide (SnO), and carbon nanotube, and the protection layer may be made of any one selected from a group consisting of a polystyrene (PS) film, a polyethylene (PE) film, a polyethylene naphthalate (PEN) film, and a polyimide (PI) film.

In addition, an electrophoretic display device according to the present invention may comprises a substrate including a display region having a plurality of pixels and a non-display region at the outside of the display region; a thin-film transistor at each pixel on the substrate; a passivation layer on the substrate to cover the thin-film transistor; a partition wall in the non-display region on the passivation layer to define a unit pixel; a pixel electrode in the display region on the passivation layer; an electrophoretic layer between the partition wall within the pixel; a sealing layer on the electrophoretic layer; a common electrode on the sealing layer; and a protection layer adhered to the common electrode.

According to the present invention, an electrophoretic layer is directly formed on an array substrate formed with a thin-film transistor, and thus an adhesive layer used to attach the electrophoretic layer to the array substrate or a protection layer for protecting the adhesive layer may not be needed, thereby reducing the fabrication cost. Moreover, the electrophoretic layer is formed in line on a fabrication line of the array substrate for forming a thin-film transistor, thereby simplifying the fabrication process.

Furthermore, a protection layer for protecting the adhesive layer may not be used in principle, thereby improving the image quality degradation problem due to electrostatic discharge generated when removing the protection layer. In addition, the electrophoretic layer and common electrode may be directly formed on the array substrate formed with a thin-film transistor, thereby basically solving the image quality degradation problem due to misalignment, compared to the related art in which the electrophoretic layer and common electrode are fabricated in separate processing lines and then attached to each other through an alignment process.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, an electrophoretic display device and fabrication method thereof according to the present invention will be described in detail with reference to the accompanying drawings.

First, the terms used herein will be defined. According to the present disclosure, a unit pixel is configured with three or four sub-pixels. Furthermore, the sub-pixel is defined by a partition wall, and includes a space defined by the partition wall. A first substrate is a place where thin-film transistors as switching elements are formed, and it may be also referred to as an array substrate.

According to the present invention, there is proposed a method of fabricating an electrophoretic display device using an in-line process. In other words, according to the present disclosure, a thin-film transistor fabrication line and an electrophoretic layer fabrication line may be formed in line to sequentially form an electrophoretic layer on the existing thin-film transistor fabrication line. As a result, the fabrication process thereof can be drastically simplified compared to the method in the related art.

Figure 2:
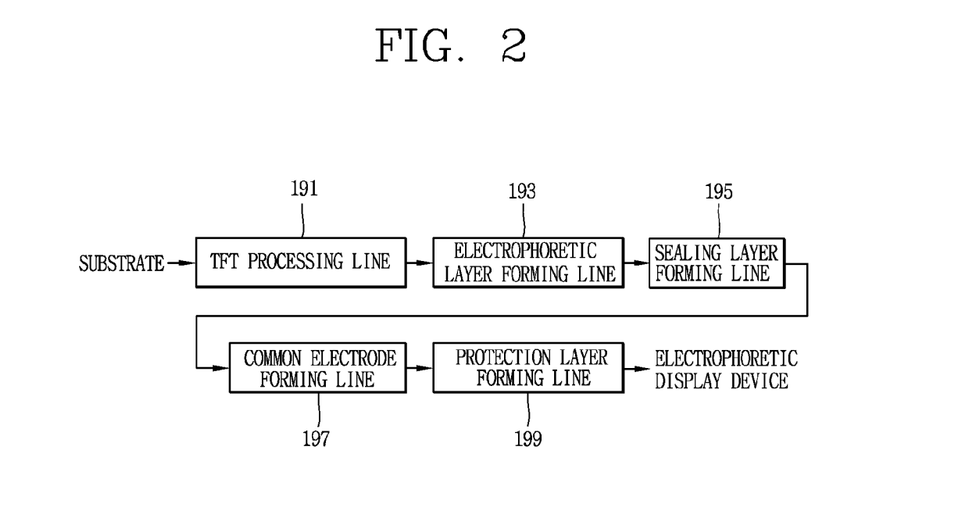
FIG. 2 is a view schematically illustrating the fabrication line of an electrophoretic display device according to the present invention.

FIG. 2 is a view schematically illustrating the fabrication line of an electrophoretic display device according to the present invention.

As illustrated in FIG. 2, a fabrication line of an electrophoretic display device according to the present invention may include a TFT processing line 191 for forming thin-film transistors, various signal lines and electrodes, an electrophoretic layer forming line 193 for applying an electrophoretic material on a substrate to form an electrophoretic layer, a sealing layer forming line 195 for sealing the electrophoretic layer, a common electrode forming line 197 for depositing a transparent conductive material on the sealing layer forming line 195 to form a common electrode, and a protection layer forming line 199 for attaching a protection layer to the fabricated common electrode.

Various processing devices, for example, a vacuum chamber, a sputter, a coater, an attacher, and the like, may be arranged to perform the relevant process in each fabrication line, and also a transfer means such as a conveyer may be arranged between the fabrication lines to transfer a process-completed substrate to a subsequent process through the transfer means.

Though not shown in the drawing, a buffer may be formed between the fabrication lines. The buffer may be provided to synchronize the fabrication lines, allowing a substrate that has been subjected to one process of the fabrication line to wait prior to being input to the subsequent process until the subsequent process of the fabrication line is completed.

In the fabrication line having the foregoing configuration, when a substrate is input to the TFT processing line 191, TFTs, signal wirings, and various electrodes are formed thereon in the TFT processing line 191, and then transferred to the electrophoretic layer forming line 193 by a transfer means. At this time, the substrate for which the process has been completed in the TFT processing line 191 waits until the process of the electrophoretic layer forming line 193 is completed. Then, if the process of the electrophoretic layer forming line 193 is completed and a substrate for which the process has been carried out within the electrophoretic layer forming line 193 is output, then the substrate is input to the electrophoretic layer forming line 193 and an electrophoretic forming process is carried out again to form an electrophoretic layer thereon.

The substrate formed with an electrophoretic layer is transferred to the sealing layer forming line 195 again by a transfer means to form a sealing layer on the substrate, and form a common electrode in the common electrode forming line 197. At this time, the substrate output from the sealing layer forming line 195 also waits in the buffer until the previous process of the common electrode forming line 197 is completed.

The substrate formed with a common electrode is transferred to the protection layer forming line 199 by a transfer line and a protection layer is adhered thereto to complete an electrophoretic display device.

As described above, according to the present invention, if a process is completed in one processing line, then it is transferred to another processing line by a transfer means to perform the relevant process, thereby allowing continuous processes to be carried out without interruption.

Hereinafter, a method of fabricating an electrophoretic display device actually fabricated in the foregoing fabrication line will be described in detail with reference to FIGS. 3A through 3G. Here, the electrophoretic display device is actually comprised of a plurality of unit pixels, but for the sake of convenience of explanation, only one pixel is illustrated in the drawing.

Figure 3A:
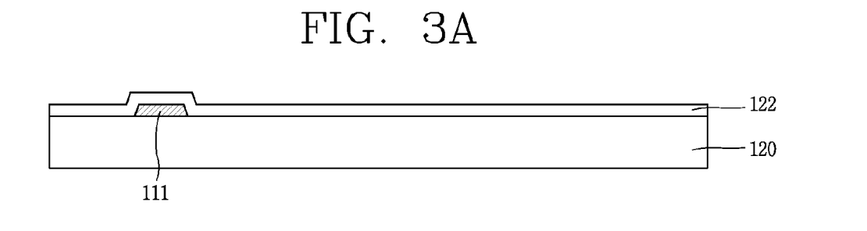
FIGS. 3A through 3I are views illustrating the method of fabricating an electrophoretic display device according to the present invention.

First, as illustrated in FIG. 3A, a non-transparent metal having a good conductivity such as Cr, Mo, Ta, Cu, Ti, Al or Al alloy is deposited on a substrate 120 comprised of a display region arranged with a plurality of pixels and a non-display region outside the display region and formed of a transparent material such as glass, plastic or the like, using a sputtering process, and then etched by a photolithography process to form a gate electrode 111, and then an inorganic insulation material such as $SiO_2$, SiNx, or the like is deposited over the entire substrate 120 formed with the gate electrode 111 using a chemical vapor deposition (CVD) process to form a gate insulation layer 122.

Figure 3B:
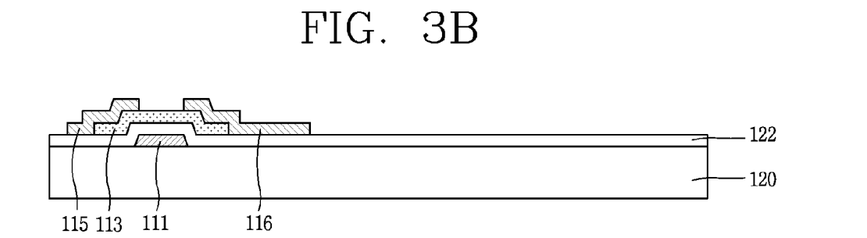

Subsequently, as illustrated in FIG. 3B, a semiconductor material such as amorphous silicon (a-Si) is deposited over the entire substrate 120 using a CVD process and then etched to form a semiconductor layer 113. Furthermore, though not shown in the drawing, impurities are doped into part of the semiconductor layer 113 or amorphous silicon added with impurities is deposited thereon to form an ohmic contact layer for ohmic contacting a source electrode and a drain electrode, which will be formed thereafter, with the semiconductor layer 113.

Figure 3C:
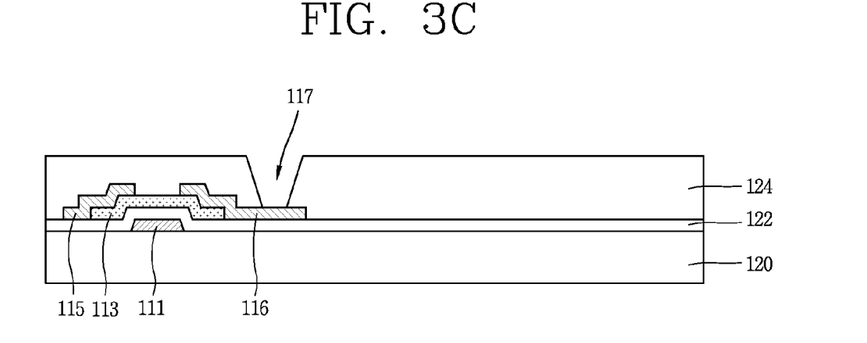

Then, as illustrated in FIG. 3C, a non-transparent metal having a good conductivity such as Cr, Mo, Ta, Cu, Ti, Al or Al alloy is deposited on the substrate 120 using a sputtering process and then etched to form a source electrode 115 and a drain electrode 116 on the semiconductor layer 113, strictly speaking, on the ohmic contact layer, and subsequently, an organic insulation material such as benzo cyclo butene (BCB) or photo acryl is deposited over the entire substrate 120 formed with the source electrode 115 and drain electrode 116 to form a passivation layer 124.

Though not shown in the drawing, the passivation layer 124 may be formed with a plurality of layers. For example, the passivation layer 124 may be formed with a double layer having an organic insulation layer made of an organic material such as BCB or photoacryl and an inorganic insulation layer made of an inorganic insulation material such as $SiO_2$, SiNx, or the like, and otherwise formed with an inorganic insulation layer, an organic insulation layer, and an inorganic insulation layer. The surface of the passivation layer 124 will be formed flat by forming an organic insulation layer, and the interface characteristic of the passivation layer 124 will be enhanced by applying an inorganic insulation layer.

Furthermore, a contact hole 117 is formed on the passivation layer 124 to expose a part of the drain electrode 116 of the thin-film transistor to the outside.

Figure 3D:
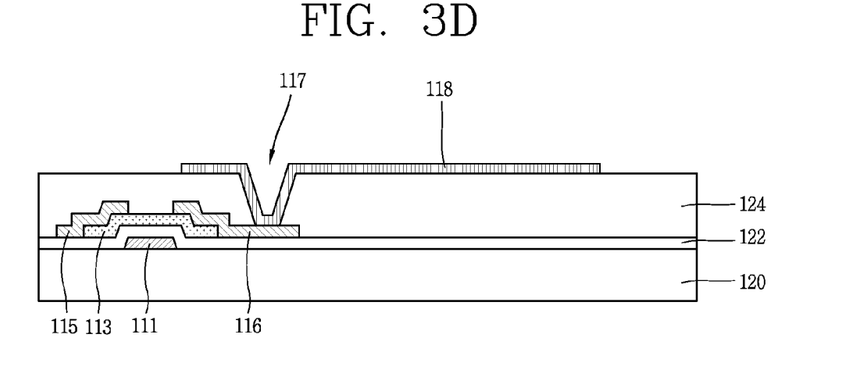

Subsequently, as illustrated in FIG. 3D, a pixel electrode 118 is formed in a display region on the passivation layer 124. Here, the pixel electrode 118 is electrically connected to the drain electrode 116 of the thin-film transistor through the contact hole 117.

The pixel electrode 118 may be formed by depositing a transparent conductive material such as indium tin oxide (ITO) and indium zinc oxide (IZO) or a metal such as Mo and AlNd, and then etching it using a photolithography process. Furthermore, the pixel electrode 118 may be formed with a plurality of metal layers. In other words, it may be formed by sequentially depositing a plurality of metal layers such as Cu and MoTi, and then etching it using a photolithography process. In addition, the pixel electrode 118 may be formed by using a carbon nanotube or water-soluble conductive polymer.

Figure 3E:
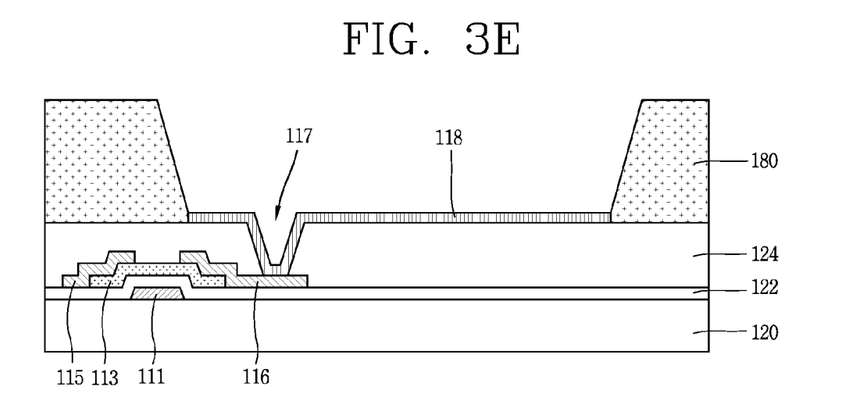

Then, as illustrated in FIG. 3E, a partition wall 180 is formed on the passivation layer 124. The partition wall 180 is formed in a region between the pixels on the substrate 120. The pixel is actually defined by the partition wall. Though not shown in the drawing, the partition wall 180 is formed along a boundary region of the pixels arranged in a matrix form on the substrate 120, and thus the partition wall 180 is also formed in a matrix form on the substrate 120.

The partition wall 180 may be formed by depositing an insulation layer made of a resin and then etching it by a photolithography process using a photoresist, or may be formed by depositing a photosensitive resin and then directly etching it by a photolithography process. Furthermore, the partition wall 180 may be formed by printing patterned partition walls 180 by a printing process such as printing roll, or may be formed by fabricating a mold formed with grooves corresponding to the partition walls and then transferring an insulation material of the mold to the substrate 120. In addition, the partition wall 180 may be formed by using an imprint process.

In actuality, the formation of the partition wall 180 is not limited by a particular process. The description of the particular process as mentioned above is not provided to limit the present invention, but merely provided for the sake of convenience of explanation. The partition wall 180 may be formed by various publicly-known processes.

On the other hand, the pixel electrode 118 may be formed subsequent to the formation of the partition wall 180. In other words, an insulating material is deposited on the passivation layer 124 and then etched to form a partition wall between pixels, and subsequently a conductive material is deposited on the passivation layer 124 and partition wall 180 and then etched to form the pixel electrode 118.

Here, the pixel electrode 118 may be formed on a side wall of the partition wall 180. The reason for extending the pixel electrode 118 up to a side wall of the partition wall 180 as described above will be described as follows.

First, extending the pixel electrode 118 up to a side wall of the partition wall 180 results in the enhancement of image quality. When the pixel electrode 118 is formed on the passivation layer 124, the pixel electrode 118 may not be normally formed at an edge region between the partition wall 180 of the pixel electrode 118 placed at the lowest position of the partition wall 180 and the pixel electrode 118. As a result, when an electric field is applied, this region becomes a dead area to which the electric field is abnormally applied. Such a dead area causes many problems such as deteriorating the aperture ratio of the liquid crystal display device, deteriorating the contrast, and the like.

However, when the pixel electrode 118 is formed at a side wall of the partition wall 180 as illustrated in the present invention, the pixel electrode 118 is formed up to an edge region and thus a dead area will not be created, thereby enhancing the aperture ratio and enhancing the contrast, and enhancing the response speed.

Second, as the pixel electrode 118 is formed at a side wall of the partition wall 180, the process will be facilitated. Though it will be described in the subsequent process, an electrophoretic material is filled in an upper region of the substrate 120 defined by the partition wall 180 and passivation layer 124. When the pixel electrode 118 is formed only on the passivation layer 124 but the pixel electrode is not formed at a side wall of the partition wall 180, the surface characteristic of the pixel electrode 118 at an upper portion of the passivation layer 124 is different from that of the partition wall 180 at the time of filling the electrophoretic material and thus the electrophoretic material may not be well deposited on a surface of the partition wall 180 at the time of filling the electrophoretic material, and as a result, the injection of the electrophoretic material will not be easily implemented. In order to prevent this problem, the surface of the partition wall may be plasma-treated or chemically treated to enhance the surface characteristic, but in this case, the process will be complicated, thereby increasing the cost.

However, when the pixel electrode 118 is extended up to a side wall of the partition wall 180, an electrophoretic material may be easily deposited at a lateral surface of the partition wall 180, i.e., a lateral surface formed with the pixel electrode 118, without additional surface treatment, and thus the electrophoretic material may be smoothly filled into the partition wall 180.

On the other hand, the pixel electrode 118 is not formed at an upper portion of the partition wall 180. If the pixel electrode 118 is formed at an upper portion of the partition wall 180, then the pixel electrodes 118 formed at pixels adjacent to one another are electrically short-circuited to one another, and thus it may be preferable to remove the pixel electrode 118 at an upper portion of the partition wall 180 when forming the pixel electrode 118.

From this point of view, the pixel electrode 118 may be formed up to a partial region of the upper portion of the partition wall 180. In other words, if a predetermined region of the pixel electrode 118 can be removed from the upper portion of the partition wall 180 to electrically isolate the pixel electrode 118 at an adjoining pixel, then the pixel electrode 118 may be extended up to the upper portion of the partition wall 180.

Figure 3F:
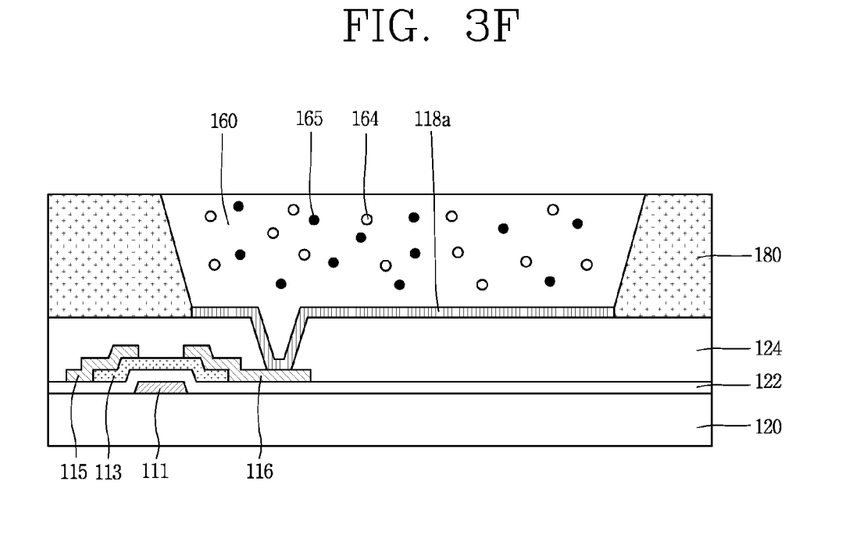

Then, as illustrated in FIG. 3F, an electrophoretic material is filled in a pixel between the partition walls 180 to form an electrophoretic layer 160. The electrophoretic material is formed of particles having a positive charge or negative charge characteristic. Here, the particles may be white particles 164 and black particles 165, and may be color particles such as cyan, magenta, and yellow, or color particles such as red (R), green (G), and blue (B).

Particles having a good reflectivity such as $TiO_2$ may be used in case of white particles 164, and particles having a black characteristic such as carbon black may be used in case of black particles 165. Here, the white particles 164 can be charged in a negative charge and the black particles 165 can be charged in a positive charge, and otherwise, the white particles 164 can be charged in a positive charge and the black particles 165 can be charged in a negative charge.

Furthermore, in case of color particles, as pigments having a charge characteristic, here, the color particles may have negative or positive charge.

A dispersive medium such as an emulsion polymer may be contained in the electrophoretic material. For the dispersive medium, black, white and color particles may be distributed therein, and it may be a liquid, such as an emulsion polymer, or may be air itself. The dispersive medium being air itself as described above means that particles are moved in air even without the dispersive medium when applying a voltage.

When an emulsion polymer is used for the dispersive medium, a black dispersive medium or color dispersive medium may be used for the dispersive medium. In case of using a black dispersive medium, light entered from the outside is absorbed to allow clear black to be displayed at the time of implementing black, thereby enhancing the contrast. Furthermore, a color dispersive medium may be used when implementing color by an electrophoretic material, and each color pixel contains the corresponding color dispersive medium at the time of color implementation, thereby showing clearer color.

Furthermore, the electrophoretic material may be a material in which capsules filled with electronic ink are distributed in a polymer binder. Here, electronic ink distributed within the capsule is composed of white particles (or white ink) and black particles (or black ink). Here, the white particles and black particles have a positive charge and a negative charge characteristic, respectively.

On the other hand, only a particular material may not be used but all currently known particles may be used for the white particles, black particles, or color particles.

The filling of the electrophoretic material into the partition wall 180 may be implemented by various processes, and the method of filling such an electrophoretic material will be described as follows.

Figure 4A:
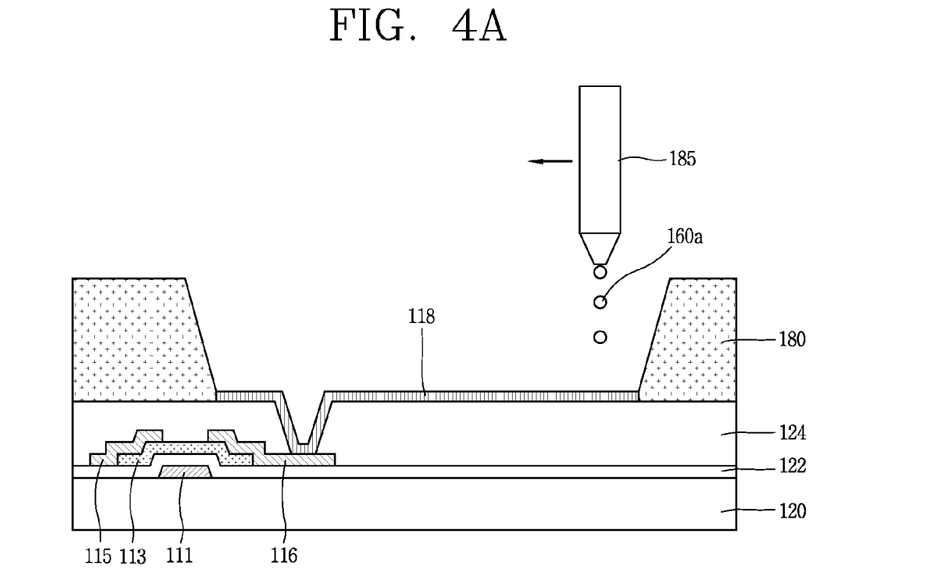
FIGS. 4A and 4B are views illustrating the method of forming an electrophoretic layer of the electrophoretic display device according to the present invention, respectively.
Figure 4B:
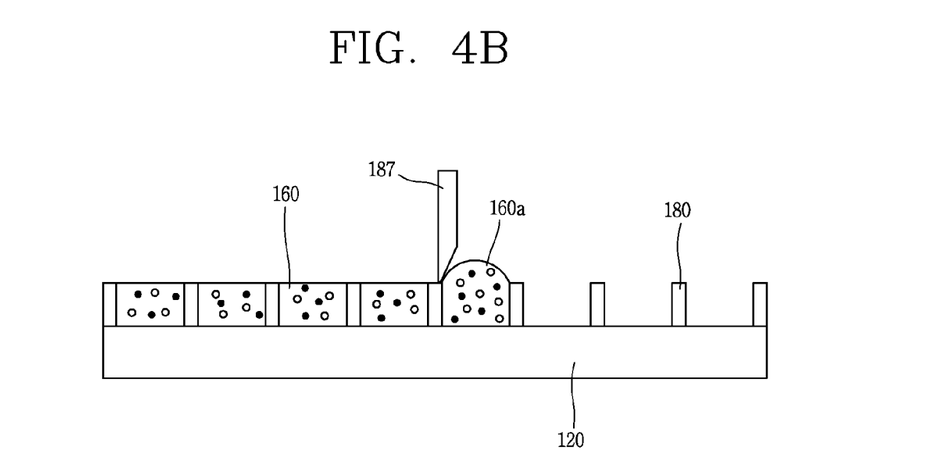

FIGS. 4A and 4B are views illustrating the method of filling an electrophoretic material into the partition wall 180 formed on the substrate 120 to form an electrophoretic layer 160.

The method illustrated in FIG. 4A relates to an inkjet process or nozzle process, and as illustrated in FIG. 4A, an electrophoretic material 160a is filled into a syringe (or nozzle) 185, and then the syringe 185 is placed at an upper portion of the substrate 120. Then, as the syringe 185 is moved on the substrate 120 in a state that a pressure is applied to the syringe 185 by an external air supply device (not shown), the electrophoretic material 160a is dropped on a pixel between the partition walls 180 to form an electrophoretic layer 160 on the substrate 120.

The process illustrated in FIG. 4B relates to a squeeze process, and as illustrated in FIG. 4B, an electrophoretic material 160a is applied to an upper portion of the substrate 120 formed with a plurality of partition walls 180, and then moved on the substrate 120 by the squeeze bar 187, and thus the electrophoretic material 160a is filled into a pixel between the partition walls 180 in the unit pixel by the pressure of the squeeze bar 187 to form an electrophoretic layer 160.

Of course, the present invention will not be limited to the foregoing processes. The foregoing process illustrates an example of the process of forming an electrophoretic layer 160 that can be used in the present invention, and the present invention will not be limited to such a particular process. For example, various processes of forming the electrophoretic layer 160 such as a casting printing process, a bar-coating printing process, a screen printing process, and a mold printing process may be applicable to the present invention.

Figure 3G:
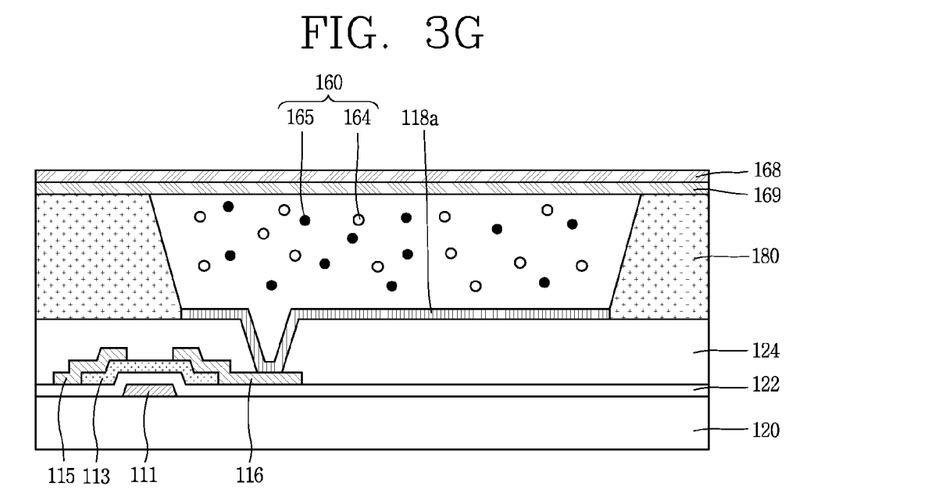

Subsequently, as illustrated in FIG. 3G, a sealing layer 168 is formed by applying a sealing material to the electrophoretic layer 160 as described above to seal the electrophoretic layer 160. Here, an acrylic transparent organic resin, an overcoat transparent organic material, or a hybrid transparent organic material may be used for the sealing material, and such an organic material may be deposited on the electrophoretic layer 160 using a spin-coating, bar-coating or bar-coating process.

The acrylic organic resin, the overcoat organic material, or the hybrid organic material does not react with the electrophoretic material even when being brought into contact with the electrophoretic material, and thus the electrophoretic material or the organic material itself can be prevented from being contaminated. As a result, it can be usefully used as a sealing material.

The sealing layer 168 may be formed in various thicknesses, but it may be formed in a thickness of 10 μm or less. The sealing layer 168 formed as described above may be cured by applying ultraviolet rays or low-temperature heat at less than 80° C.

an interlayer 169 may be further formed on the electrophoretic layer 160 after the electrophoretic layer 160 has been filled for each sub-pixel to solve the problem in which electrophoretic particles are electrically adhered to the sealing layer 168, thereby preventing electrophoretic particles from being directly brought into contact with the sealing layer 168. When the interlayer 169 is used, the electrophoretic particles 164, 165 do not adhere to the sealing layer 168, thereby reducing the generation of failed pixels.

The interlayer 169 may be a photosensitive organic material like the partition wall 180, for example, Methyl ethyl ketone. The interlayer 169 may be formed by coating a material of thickness of several nanometers at an upper end of the electrophoretic layer 160 and partition wall 180. The interlayer 169 completely seals the electrophoretic layer in a temporary manner, thereby facilitating the formation of a sealing layer, as well as solving the problem of electrophoretic particles being adhered to the sealing layer.

Figure 3H:
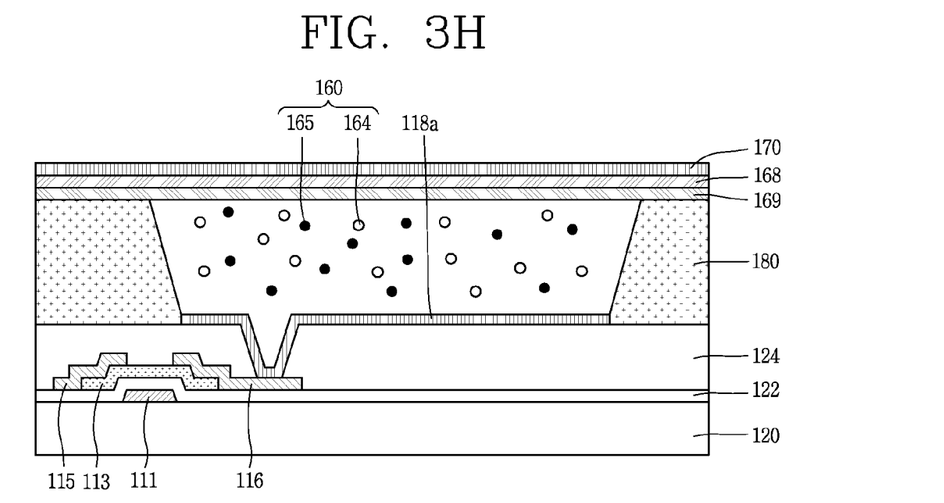

Then, as illustrated in FIG. 3H, a transparent conductive material is deposited on the cured sealing layer 168 to form a common electrode 170. The common electrode 170 is formed by applying a transparent conductive oxide material such as gallium zinc oxide (IGZO) and zinc oxide (ZnO) in a solution state and then curing at a low temperature.

Furthermore, the common electrode 170 may be formed by depositing a transparent conductive material such as ITO or IZO using a sputtering process or depositing tin oxide (SnO) using a chemical vapor deposition (CVD) process. Furthermore, the common electrode 170 may be formed by depositing carbon nanotubes.

Since the sealing layer 168 may be damaged at high temperature. Thus, the transparent conductive material may be deposited at the room temperature to avoid the damage of the sealing layer 168 by the high temperature process.

Figure 3I:
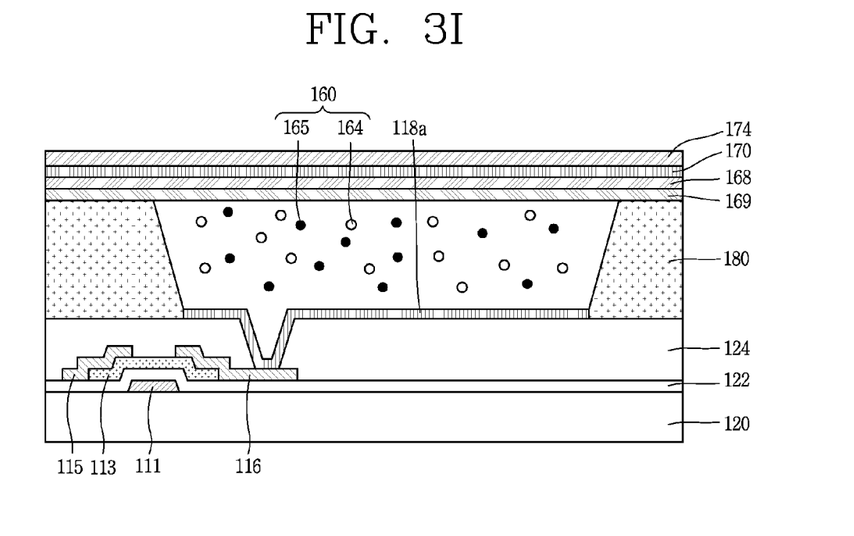

Then, as illustrated in FIG. 3I, a protection film 174 is adhered to the common electrode 170 to protect the electrophoretic layer 160 from an external shock or foreign substances. Various kinds of films having a transmittance of 90% or more and a water permeability of 10-3 g/m$^2$·day or less may be used for the protection film 174. For example, a polystyrene (PS) film, a polyethylene (PE) film, a polyethylene naphthalate (PEN) film, or a polyimide (PI) film may be used for the protection film 174 of the present invention. The protection film 174 may be adhered thereto by applying a transparent adhesive agent to the common electrode 170 and then laminating it.

As described above, according to the present invention, in the electrophoretic display device fabrication line configured with an in-line process, a thin-film transistor, a common electrode 118, an electrophoretic layer 160, a sealing layer 168, a common electrode 170 and a protection film 174 are sequentially formed on one substrate 120, and thus an additional process of attaching a lower substrate to an upper substrate can be removed, thereby simplifying the fabrication process.

The structure of an electrophoretic display device fabricated by the foregoing process will be described in detail below with reference to FIG. 3I.

As illustrated in FIG. 3I, in an electrophoretic display device according to the present invention, a thin-film transistor comprised of a gate electrode 111, a semiconductor layer 113, a source electrode 115, and a drain electrode 116 may be formed on a pixel of the substrate 120, and a passivation layer 124 may be formed thereon. A partition wall 180 is formed on the passivation layer 124 between pixels and an electrophoretic layer 160 is also disposed on a pixel between the partition walls 180, and thus the electrophoretic layer 160 is directly brought into contact with the pixel electrode 118. Accordingly, contrary to the electrophoretic display device in the related art, an additional adhesive layer for adhering the electrophoretic layer 160 between the electrophoretic layer 160 and first pixel electrode 118 and the passivation layer 124 will not be needed.

Furthermore, according to the present invention, the pixel electrode 118 may be formed only on a unit pixel or may be formed to be extended to a side wall of the partition wall 180. If it is extended up to a side wall of the partition wall 180 as described above, then a voltage is also applied to the pixel electrode 118 at a lower region of the partition wall 180, thereby preventing image quality from being degraded due to a dead area in this region.

The electrophoretic layer 160 may be sealed by the sealing layer 168 at an upper portion thereof, and the common electrode 170 and protection film 174 may be sequentially formed on the sealing layer 168.

The operation of an electrophoretic display device having the foregoing structure will be described as follows. When an electrophoretic material is formed of white particles 164 and black particles 165, the white particles 164 are charged in a positive charge or negative charge. Accordingly, if a signal is inputted from the outside and passed through a thin-film transistor formed on the substrate 120 and applied to the pixel electrode 118, then the white particles 164 are moved in the electrophoretic layer 160 by an electric field generated between the pixel electrode 118 and the common electrode 170.

For example, if a positive (+) voltage is applied to the pixel electrode 118 and a negative (−) voltage is applied to the common electrode 170 when the white particles 164 are charged in the positive (+) charge, then the positive (+) charged white particles 164 are moved to a side of the common electrode 170. Accordingly, if light is incident from an upper portion of the common electrode 170, then incident light may be mostly reflected by the white particles 164, thereby implementing white on the electrophoretic display device.

At this time, a density of white particles 164 moving to the side of the common electrode 170 or a distance from the common electrode 170 varies according to the intensity of a voltage applied to the pixel electrode 118, and thus the intensity of light entered from the outside and reflected by white particles 164 also varies, thereby implementing a desired brightness.

On the contrary, if a negative (−) voltage is applied to the pixel electrode 118 and a positive (+) voltage is applied to the common electrode 170, then the positive (+) charged white particles 164 are moved to the side of the substrate 120. Accordingly, if light is incident from the outside, then incident light is mostly not reflected, thereby implementing black.

On the other hand, a positive (+) voltage is applied to the pixel electrode 118 and a relatively negative (−) voltage is applied to the common electrode 170 when the white particles 164 are charged in the negative (−) charge, then the negative (−) charged white particles 164 are moved to the side of the substrate 120. Accordingly, if light is incident from the outside i.e., an upper portion of the common electrode 170, then incident light is mostly not reflected, thereby implementing black on the electrophoretic display device.

On the contrary, if a negative (−) voltage is applied to the pixel electrode 118*a* and a positive (+) voltage is applied to the common electrode 170, then the negative (−) charged white particles 164 are moved to the side of the common electrode 170. Accordingly, if light is incident from the outside, then incident light is mostly reflected by the white particles 164, thereby implementing white.

When the electrophoretic material is formed of color particles, R, G and B color particles or color particles such as cyan, magenta and yellow may be moved to the side of the common electrode 170 according to a signal applied to the pixel electrode 118, thereby implementing the relevant color or a color mixed with another pixel.

If the electrophoretic material is formed of a polymer binder in which capsules filled with white particles and black particles are distributed, then white particles and black particles contained in electronic ink distributed in the capsules have a positive charge and a negative charge characteristic, respectively. Accordingly, if a signal is inputted from the outside and applied to the pixel electrode 118, then white particle and black particles are separated in the capsule by an electric field generated between the pixel electrode 118 and the common electrode 170. For example, if a negative (−) voltage is applied to the pixel electrode 118 and a relatively positive (+) voltage is applied to the common electrode 170, then the positive (+) charged white particles 164 are moved to the side of the substrate 120, and the negative (−) charged black particles are moved to the side of the common electrode 170. In this state, if light is incident from the outside, namely, an upper portion of the common electrode 170, then incident light may be reflected by the black particles, thereby implementing black on the electrophoretic display device.

On the contrary, if a positive (+) voltage is applied to the pixel electrode 118 and a negative (−) voltage is applied to the common electrode 170, then the positive (+) charged white particles 164 are moved to the side of the common electrode 170, and the negative (−) charged black particles are moved to the side of the substrate 120.

In this state, if light is incident from the outside, namely, an upper portion of the common electrode 170, then incident light is reflected by the white particles, thereby implementing white.

Here, if white particle and black particle in the capsules have a negative charge and positive charge characteristic, respectively, then white and black may be implemented by an inverse operation.

As described above, according to the present disclosure, all constituent elements, i.e., a thin-film transistor, an electrophoretic layer, a sealing layer, and common electrode, may be formed on a substrate made of glass or plastic, and accordingly, the process of transferring separate substrates formed with the electrophoretic layer and common electrode and aligning them with a thin-film transistor substrate and then attaching to one another may not be needed. As a result, compared to the related art, an adhesive layer for adhering a substrate formed with an electrophoretic layer to a thin-film transistor substrate or a protection layer for protecting the adhesive layer may not be needed, and the process of aligning two substrates, the process of peeling off a protection layer for protecting an adhesive layer of the substrate formed with an electrophoretic layer, and the like, may not be required.

On the other hand, though the foregoing description has been limited to a specific structure of the electrophoretic display device, the electrophoretic display device according to the present disclosure will not be limited the specific structure. In particular, it may be applicable to various currently used electrophoretic layers. In other words, it may be applicable to all kinds of electrophoretic layers having the structure that can be formed on a substrate.

Although the preferred embodiment of the present invention has been described in detail in the above, it should be understood by those skilled in the art that various modifications and other equivalent embodiments thereof can be made.

Consequently, the rights scope of the present invention is not limited to the embodiments and various modifications and improvements thereto made by those skilled in the art using the basic concept of the present invention as defined in the accompanying claims will fall in the rights scope of the invention.

What is claimed is:

1. A method of fabricating an electrophoretic display device, the method comprising:
   providing a substrate including a display region comprising a plurality of pixels and a non-display region at the outside of the display region;
   forming a thin-film transistor at each pixel on the substrate;
   forming a passivation layer on the substrate to cover the thin-film transistor;
   forming a pixel electrode for each pixel and a partition wall between pixels on the passivation layer;
   forming an electrophoretic layer in a pixel between partition walls on the passivation layer;
   forming a sealing layer at least on an upper portion of the electrophoretic layer;
   directly coating a transparent conductive material on the sealing layer to form a common electrode;
   directly coating a transparent adhesive agent on an upper surface of the common electrode; and
   attaching a protection film to the upper surface of the common electrode by the transparent adhesive agent.

2. The method of claim 1, wherein the forming the sealing layer forms the sealing layer on an upper portion of the electrophoretic layer and a top surface of the partition walls.

3. The method of claim 1, further comprising forming an interlayer between the electrophoretic layer and the sealing layer.

4. The method of claim 3, wherein the interlayer includes Methyl Ethyl Ketone.

5. The method of claim 1, wherein the forming a pixel electrode and a partition wall comprises:
   forming a pixel electrode at each pixel on the passivation layer; and
   forming a partition wall between pixels on the passivation layer.

6. The method of claim 1, wherein the forming a pixel electrode and a partition wall comprises:
   forming a partition wall between pixels on the passivation layer; and
   forming a pixel electrode at each pixel on the passivation layer.

7. The method of claim 6, wherein the pixel electrode is further formed on a side surface of the partition wall.

8. The method of claim 6 or 7, wherein the forming a partition wall comprises:
   forming an insulation layer on the passivation layer; and
   removing part of the insulation layer corresponding to the pixel using any one of a photolithography process, a mold process, and an imprint process.

9. The method of claim 1, wherein the electrophoretic material comprises charged white particles and charged black particles.

10. The method of claim 9, wherein the electrophoretic material further comprises a dispersive medium.

11. The method of claim 10, wherein the dispersive medium is emulsion polymer or air.

12. The method of claim 10, wherein the dispersive medium is non-polarized organic medium.

13. The method of claim 1, wherein the electrophoretic material comprises charged color particles.

14. The method of claim 1, wherein the forming an electrophoretic layer comprises filling an electrophoretic material between the partition walls using any one of a dropping method, a squeeze method, a casting printing method, a bar-coating printing method, a screen printing method, and a mold printing method.

15. The method of claim 1, wherein the forming a sealing layer comprises:
   applying a sealing material to an upper portion of the electrophoretic layer; and
   curing the sealing material.

16. The method of claim 15, wherein the sealing material is formed of at least one material selected from a group consisting of an acrylic transparent organic resin, an overcoat transparent organic material, and a hybrid transparent organic material.

17. The method of claim 15, wherein the curing the sealing material comprises irradiating ultraviolet rays on the sealing material.

18. The method of claim 15, wherein the curing a sealing material comprises applying heat of less than 80° C. to the sealing material.

19. The method of claim 1, wherein the sealing layer is formed with a thickness of 10 µm or less.

20. The method of claim 1, wherein the common electrode is comprises a soluble transparent conductive material.

21. The method of claim 20, wherein the soluble transparent conductive material comprises indium gallium zinc oxide (IGZO) and zinc oxide (ZnO).

22. The method of claim 1, wherein the common electrode comprises indium tin oxide (ITO) and indium zinc oxide (IZO).

23. The method of claim 22, wherein the ITO and IZO are deposited by a sputtering method in a room temperature.

24. The method of claim 1, wherein the common electrode comprises tin oxide (SnO).

25. The method of claim 24, wherein the SnO is deposited by a chemical vapor deposition (CVD) method.

26. The method of claim 1, wherein the common electrode comprises carbon nanotubes.

27. The method of claim 1, wherein the protection film comprises material selected from a group consisting of: a polystyrene (PS) film, a polyethylene (PE) film, a polyethylene naphthalate (PEN) film, and a polyimide (PI) film.

28. An electrophoretic display device, the device comprising:
   a substrate including a display region comprising a plurality of pixels and a non-display region at the outside of the display region;
   a thin-film transistor at each pixel on the substrate;
   a passivation layer on the substrate to cover the thin-film transistor;
   a partition wall on the passivation layer in the display region to define a pixel;
   a pixel electrode at each pixel on the passivation layer and a side surface of the partition wall;
   an electrophoretic layer between the partition walls within a pixel;
   a sealing layer at least on an upper portion of the electrophoretic layer;
   a common electrode on the sealing layer; and
   a protection layer formed on the common electrode.

29. The device of claim 28, wherein the electrophoretic material comprises charged white particles and charged black particles.

30. The device of claim 28, wherein the electrophoretic material comprises charged color particles.

31. The device of claim 29 or 30, wherein the electrophoretic material further comprises a dispersive medium.

32. The device of claim 28, wherein the sealing layer comprises at least one material selected from a group consisting of: an acrylic transparent organic resin, an overcoat transparent organic material, and a hybrid transparent organic material.

33. The device of claim 28, wherein the common electrode comprises material selected from a group consisting of: indium gallium zinc oxide (IGZO), zinc oxide (ZnO), indium tin oxide (ITO), indium zinc oxide (IZO), tin oxide (SnO), and carbon nanotube.

34. The device of claim 28, wherein the protection film comprises material selected from a group consisting of: a polystyrene (PS) film, a polyethylene (PE) film, a polyethylene naphthalate (PEN) film, and a polyimide (PI) film.

35. The device of claim 28, further comprising an interlayer between the electrophoretic layer and the sealing layer.

36. The device of claim 35, wherein the interlayer includes Methyl Ethyl Ketone.

* * * * *